April 11, 1961  M. J. LAMBERTI  2,979,694
SAFETY SIGNALLING DEVICES FOR VEHICLE LIFTS
Filed June 22, 1960
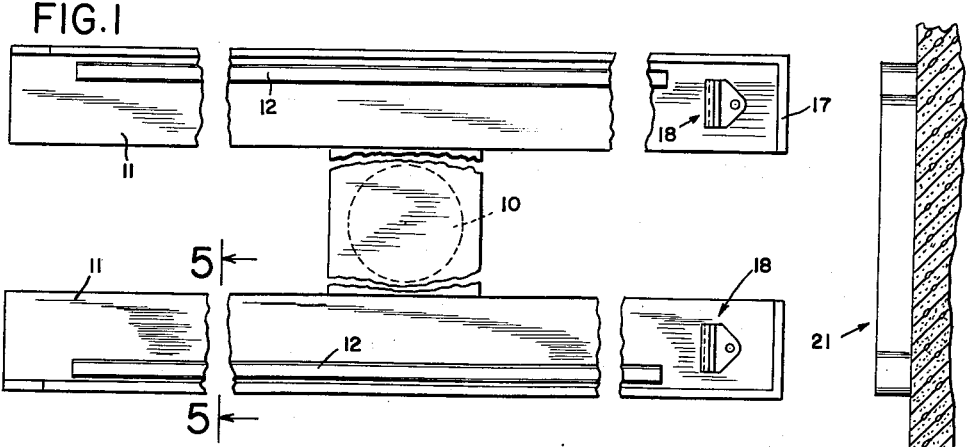
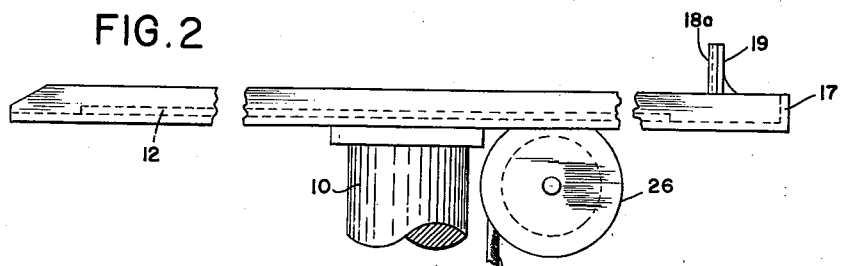
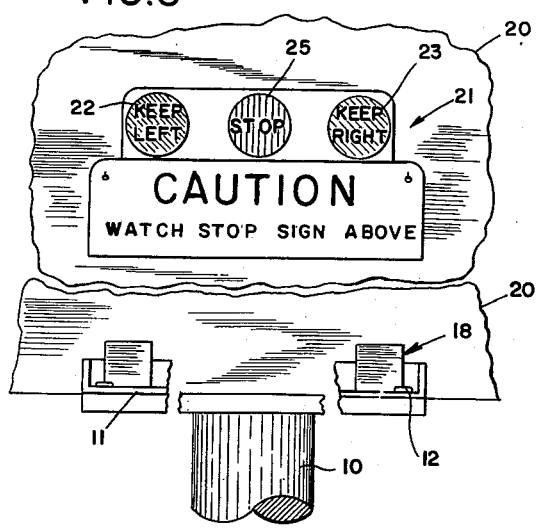
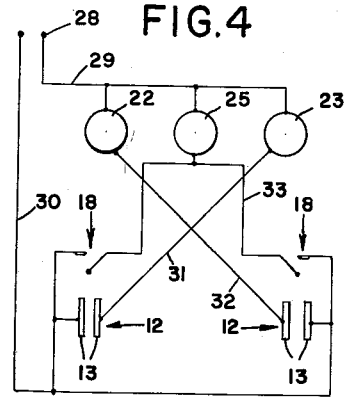
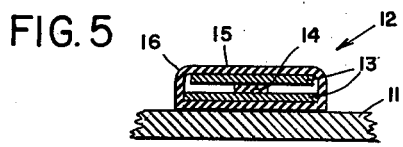
INVENTOR.
MARTIN J. LAMBERTI
BY F. Ledermann
ATTORNEY United States Patent Office 2,979,694
Patented Apr. 11, 1961

2,979,694

SAFETY SIGNALLING DEVICES FOR VEHICLE LIFTS

Martin J. Lamberti, 116—02 232nd St., Cambria Heights, N.Y.

Filed June 22, 1960, Ser. No. 37,999

8 Claims. (Cl. 340—61)

This invention relates to car lifts of the kind found in service stations to lift a vehicle in order to gain ready access to the underportions thereof for the purpose of lubrication, repair or other services. The ramps or rails of the lift upon which a car must be driven are elevated above ground level, and it frequently occurs that a person driving his car along the rails, since he is unable to see his wheels, steers the car too far to one side or the other, as well as even too far. Under any of such conditions the car is apt to ride off the rails with consequent inconvenience as well as danger to life and property.

It is an object of the present invention to provide new and useful improvements in automatic electric signalling means for car lifts, by means of which the driver is made constantly aware of the position of the car on the rails and is given instant warning how to steer the car up the rails and when to come to a halt.

Another object of the invention is the provision of a circuit-closing strip extending along each rail and positioned toward the outer edge of the rail, both connected in circuit with suitable warning lamps to be energized selectively as the front wheels of the car move too close to one side or the other while the car moves along the rails.

A further object of the invention is the provision of a switch on the rear end portion of each rail connected in circuit with a warning "STOP" lamp adapted to be energized when contacted by a front wheel of the car, to warn the driver to come to a stop.

A still further object of the invention is the provision of a single compact warning sign containing the warning lamps as well as additional cautionary information, adapted to be mounted on a wall beyond the rear ends of the lift rails, or to be suspended from the ceiling, in a position to be clearly visible to the driver.

The above as well as additional objects will be clarified in the following description wherein reference numerals refer to like-numbered parts in the accompanying drawing. It is to be noted that the drawing is intended solely for the purpose of illustration of the invention and that it is therefore neither desired nor intended to limit the invention necessarily to any or all of the exact details shown or described except insofar as they may be deemed essential to the invention as defined in the appended claims.

Referring briefly to the drawing,

Fig. 1 is a car lift embodying features of the present invention showing also the visible warning sign mounted on a wall, shown in section, rearward of the lift.

Fig. 2 is a fragmentary side elevational view of the car lift.

Fig. 3 is a fragmentary front elevational view of the same, showing also the warning sign.

Fig. 4 is a wiring diagram.

Fig. 5 is an enlarged sectional view taken on the line 5—5 of Fig. 1.

Referring in detail to the drawing, the numeral 10 indicates the usual hydraulically or air operated lifting post of a standard car lift of the kind mentioned, which supports the two parallel rails upon which a car is driven.

Secured along each rail 11, parallel with the longitudinal edges thereof and positioned to the right of the median line of the rail, is an electric contacting, or circuit closing strip 12 which terminates a suitable distance short of the rear end of the rail. The strips may be secured to the rails in any desired manner; for example, they may be cemented thereto, not shown, or otherwise affixed.

In each strip 12 there are a pair of opposed parallel elongated springy metallic strips 13 separated along their median lines by insulation 14 and covered with insulation 15, the insulation 15 constituting a flexible insulating sheath surrounding the strips 13. Thus, as a car wheel touches an edge thereof, such as the edge 16, while moving along a rail, the two metallic strips 13 are brought into mutual contact to close the circuit in which the strip 12 is inserted as a switch.

At an appropriate distance forward of the rear ends 17 of the rails, on each rail there is shown to be an upstanding switch 18 which may be made in any desired form or it may consist of a brace or bracket 18a having secured against the front wall thereof a shortened contact strip 18b mounted on the front or face of a supporting bracket 19 secured to the rail.

At a suitable position rearward of the lift, either mounted on a wall 20, or suspended from the ceiling, not shown, at an elevation for clear visibility by a person driving the car on the rails, is a signal sign 21. This sign bears a signal lamp 22 on the left side bearing the insignia "Keep Left," a signal lamp 23 on the right side reading "Keep Right," and intermediate therebetween a signal lamp or the like 25 reading "Stop." The latter lamp is energized when either switch 18 is closed, caused by a front wheel contacting the same.

The various wires or cables required for the structure are not shown in Figs. 1–4, except that at 26 is shown a self-winding spring drum upon which a common cable 27 in which all of the required conductors are included or enclosed. This cable may be led down and into a conduit or passage in the concrete floor of the pit, not shown, or of course, led in any other suitable or desired manner to an electric outlet.

The wiring diagram of Fig. 4 shows the electrical circuits whereby the appropriate signal lamp or lamps are energized to guide the driver of the car. One terminal of the electric source or socket 28 has a lead 29 common to the three lamps 22, 25 and 23 on one side of the lamps. Another lead 30 is common to one of the contact strips 13 of each rail 12. From the left-hand (Fig. 4) rail 12 a lead extends from the other strip 13 of the rail to the other terminal of the lamp 23. From the right-hand rail 12 a lead 32 extends from the other strip 13 to the other side of the lamp 22. A lead 33, connected to the other side of the lamp 25, leads in opposite directions to one terminal of each of the "Stop" switches 18; the other terminal of each of these switches is connected, through leads 34, to the first-named contacts strips 13 of the two members 12.

It is thus apparent that, as a car proceeds along the rails 11, if the right front wheel is too far to the left of the rail, the left wheel will cause mutual contact of the contact strips 13 on the left-hand rail and thus close the circuit through the lamp 23 to flash on the warning "Keep Right" in the lamp 23. The converse takes place to flash on the warning "Keep Left" in the lamp 22 if the front wheels are too far to the right. When either front wheel engages a switch 18 the switch will be closed and the "Stop" signal lamp will be flashed on.

As a consequence of this invention it is quite apparent that a car driven on to such a lift will be in no danger of running off the rails or going too far thereon. Moreover, a lift installed with the apparatus of the present invention does not require the services of an attendant to watch carefully as the driver proceeds and to call out continuously to him to keep to the right or to the left and to shout when the driver is to stop. Thus the device is not only very useful and practical from the viewpoint of safety, but it also offers economy of man power.

While the present invention has been described with reference to the device illustrated in the drawing, such is not to be construed as a limitation upon the invention, which is best defined in the appended claims.

The invention having thus been described, what is claimed and desired to be secured by Letters Patent, is as follows:

1. In a vehicle lift including a rigid frame having spaced parallel horizontal rails upon which a vehicle is adapted to be driven to be lifted and means for lifting the frame, the improvement consisting in the provision of elongated normally open circuit-closing means on and extending along each of said rails adapted to be closed upon contact therewith of a front wheel of the vehicle, two spaced signal lamps adapted to be positioned above and spaced rearward from the rear ends of said rails in a position of visibility to the driver of the vehicle, an electric circuit including leads connecting the circuit-closing means of the right-hand rail of said rails with one of said lamps for energization of said one of said lamps upon closing of the right-hand circuit-closing means; and additional leads connecting the circuit-closing means of the left-hand rail of said rails with the other of said lamps for energization of said other of the lamps upon closing of the left-hand circuit closing means, the circuit being adapted to be connected to an electric supply source, said one of said lamps bearing a legend directing the driver to steer the vehicle to the left, said other of said lamps bearing a legend directing the driver to steer the vehicle to the right.

2. A device according to claim 1, wherein said circuit-closing means consists of two closely spaced normally substantially parallel resilient metallic strips one of which is substantially immovably secured to the rail.

3. A device according to claim 2, including a third signal lamp bearing a legend directing the driver to stop the vehicle, each of said rails having an electric switch thereon near the rear end thereof in the path of a front wheel of the vehicle and including means for closing the switch upon impact therewith of the front wheel, said circuit including leads connecting each of said switches separately with said third lamp for energization of the third lamp upon closing of either one of said switches.

4. A device according to claim 3, said switches each comprising a vertically elongated upright member extending upward from the rail.

5. A device according to claim 1, including a third signal lamp bearing a legend directing the driver to stop the vehicle, each of said rails having an electric switch thereon near the rear end thereof in the path of a front wheel of the vehicle and including means for closing the switch upon impact therewith of the front wheel, said circuit including leads connecting said third lamp with one of said switches for energization of the third lamp upon closing said one of the switches and leads connecting said third lamp with the other of said switches for energization of the third lamp upon closing of said other of the switches.

6. A device according to claim 1, wherein said circuit-closing means consists of two elongated closely spaced resilient contact members normally spaced equidistant from each other and having an insulating sheath enclosing the same and secured to the rail.

7. A device according to claim 6, each of said contact members comprising a horizontal strip and an insulating member extending longitudinally between said strips spacing the strips from each other.

8. A device according to claim 7, said insulating member having a width smaller than the width of said strips and having that longitudinal edge thereof remote from the outside edge of the rail spaced from the edges of said strips nearest the inside edge of the rail.

No reference cited.